US006936815B2

(12) United States Patent
Tehlirian et al.

(10) Patent No.: US 6,936,815 B2
(45) Date of Patent: Aug. 30, 2005

(54) INTEGRATED SHIELD IN MULTIPOLE ROD ASSEMBLIES FOR MASS SPECTROMETERS

(75) Inventors: Berg A. Tehlirian, Daly City, CA (US); Michael W. Senko, Sunnyvale, CA (US); Nigel P. Gore, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 4 days.

(21) Appl. No.: 10/456,894

(22) Filed: Jun. 5, 2003

(65) Prior Publication Data

US 2004/0245460 A1 Dec. 9, 2004

(51) Int. Cl.[7] .......................... H01J 49/00; B01D 59/44
(52) U.S. Cl. ....................................... 250/292; 250/290
(58) Field of Search ................................ 250/290, 292, 250/293, 396 R

(56) References Cited

U.S. PATENT DOCUMENTS 4,032,782 A * 6/1977 Smith et al. ................ 250/292
4,117,321 A * 9/1978 Meyer ........................ 250/292
4,700,069 A * 10/1987 Ino et al. .................... 250/292
4,870,283 A * 9/1989 Taya ...................... 250/396 R
4,885,470 A * 12/1989 Abbott ................... 250/396 R
4,949,047 A * 8/1990 Hayward et al. ........... 315/505
4,990,777 A * 2/1991 Hurst et al. ................. 250/292
5,291,016 A * 3/1994 Taya .......................... 250/292
5,315,120 A * 5/1994 Potter ..................... 250/396 R
5,373,157 A * 12/1994 Hiroki et al. ............... 250/292
5,389,785 A * 2/1995 Steiner et al. .............. 250/292
5,420,425 A 5/1995 Bier et al.
5,459,315 A * 10/1995 Waki .......................... 250/292
5,616,919 A * 4/1997 Broadbent et al. .......... 250/292
5,852,294 A * 12/1998 Gulcicek et al. ............ 250/292
6,069,355 A * 5/2000 Mordehai ................... 250/281
6,239,429 B1 * 5/2001 Blessing et al. ............ 250/292
6,441,370 B1 * 8/2002 Khosla et al. .............. 250/292
6,465,792 B1 * 10/2002 Baptist ................... 250/396 R
6,617,578 B1 * 9/2003 Tong .......................... 250/292

* cited by examiner

*Primary Examiner*—John R. Lee
*Assistant Examiner*—Kalimah Fernandez
(74) *Attorney, Agent, or Firm*—Fish & Richardson P.C.

(57) ABSTRACT

Multipole rod assemblies for guiding or trapping ions in a mass spectrometer. A multipole rod assembly includes a plurality of modules. Each module includes a shield element, one or more insulating elements coupled to the shield element, and one or more multipole rods mounted on the insulating elements, wherein the modules are coupled together to form the multipole rod assembly such that the multipole rods of the modules define an interior volume for guiding or trapping ions.

30 Claims, 5 Drawing Sheets

INTEGRATED SHIELD IN MULTIPOLE ROD ASSEMBLIES FOR MASS SPECTROMETERS

BACKGROUND

The present invention relates to mass spectrometers.

A mass spectrometer analyzes masses of particles, such as atoms and molecules, and typically includes an ion source, one or more mass analyzers and detectors. In the ion source, particles are ionized and extracted from a sample. The particles can be ionized using a variety of techniques, such as electrostatic forces, or laser, electron, or other particle beams, and the ions can be extracted using electric fields. The ions are transported to one or more mass analyzers that separate the ions based on their mass-to-charge ratio. The separated ions are detected by one or more detectors that provide data that is used to construct a mass spectrum of the sample.

The ions can be guided, trapped, and analyzed by multipole rod assemblies, including but not limited to quadrupole, hexapole, octapole or greater assemblies including four, six, eight, or more multipole rods, respectively. (Techniques for preparing such assemblies are described, for example, in U.S. Pat. No. 5,389,785 to Steiner et al, filed Apr. 28, 1993, which is incorporated by reference herein in its entirety.) In the assembly, the multipole rods are arranged to define an interior volume, e.g., a channel or a ring, in which multipole electric potentials can be generated by applying voltage on the multipole rods. For example, quadrupole electric potentials can be generated in a quadrupole rod assembly including two pairs of opposing rods by applying a voltage on the first pair and an inverse voltage on the second pair. By periodically changing the applied voltage, the quadrupole electric potentials can guide or trap in the interior volume ions that have mass-to-charge ratios within an effective range. The effective range is defined by mass-to-charge ratios of ions that can be guided or trapped in the interior volume. Ions with mass-to-charge ratios outside the effective range escape the interior volume.

The effective range of mass-to-charge ratios can be tuned by the applied voltage and its frequency. For guiding or trapping ions, the effective range is typically kept wide. For analyzing the guided or trapped ions, the effective range can be narrowed such that only ions with particular mass-to-charge ratios leave the interior volume. These ions can be detected to measure a mass spectrum. Resolution of the measured spectrum depends on the precision of the multipole electric potentials that, in turn, depend on the shape and position of the multipole rods in the assembly.

SUMMARY

The invention provides multipole rod assemblies that include two or more modules, where each module includes a shield element coupled to one or more insulating elements on which one or more multipole rods are mounted. In general, in one aspect, the invention provides a multipole rod assembly for guiding or trapping ions in a mass spectrometer. The assembly includes a plurality of modules. Each module includes a shield element, one or more insulating elements coupled to the shield element, and one or more multipole rods mounted on the insulating elements. The modules are coupled together to form the multipole rod assembly such that the multipole rods of the modules define an interior volume for guiding or trapping ions.

In general, in another aspect, the invention provides a module for forming a multipole rod assembly for guiding or trapping ions in a mass spectrometer, where the multipole rod assembly is formed from two or more modules. The module includes a shield element, one or more insulating elements coupled to the shield element, and one or more multipole rods mounted on the insulating elements.

Particular implementations can include one or more of the following features. Each module can include two or more mating surfaces, and the modules can be coupled by matching mating surfaces of each module with complementary mating surfaces of adjacent modules in the multipole rod assembly. In each module, the shield element can be a metal structure including the two or more mating surfaces, or a metal layer on one or more insulating elements of the module, and the two or more mating surfaces can be formed in one or more insulating elements of the module. Each multipole rod in the assembly can define a hyperbolic surface configured to generate multipole electric potentials in the interior volume. The assembly can include four multipole rods configured to generate a quadrupole electric potential in the interior volume. Each of the four multipole rods configured to generate a quadrupole electric potential can be mounted on a different module. The assembly can include eight multipole rods configured to generate an octapole electric potential in the interior volume. Each module can include two or more multipole rod segments arranged along a single axis.

In general, in another aspect, the invention provides methods implementing and using techniques for manufacturing a module for a multipole rod assembly for guiding or trapping ions in a mass spectrometer. The techniques include coupling one or more insulating elements to a shield element, mounting one or more multipole rods on the one or more insulating elements, and machining the mounted multipole rods to form multipole surfaces to generate multipole electric potentials in the assembly.

Particular implementations can include one or more of the following features. The module can be machined to form two or more mating surfaces to couple the module with another module. Machining the mounted multipole rods and machining the module to form mating surfaces can include using a machining tool having a single profile for machining the mounted multipole rods and the module to form mating surfaces. Machining the module to form mating surfaces can include machining the shield element and/or one or more of the insulating elements. Coupling one or more insulating elements to a shield element can include bonding one or more insulating elements to a metal structure of the shield element and/or depositing a metal layer on one or more insulating elements. Mounting one or more multipole rods on the one or more insulating elements can include bonding one or more multipole rods on the one or more insulating elements and/or depositing a metal layer on one or more insulating elements. One or more multipole rods can be segmented.

In general, in another aspect, the invention provides methods implementing and using techniques for manufacturing a multipole rod assembly for use in a mass spectrometer. The techniques include coupling a plurality of modules, where each module includes a shield element, one or more insulating elements coupled to the shield element, and one or more multipole rods mounted on the insulating elements.

Particular implementations can include one or more of the following features. Each module can include two or more mating surfaces, and coupling modules can include matching mating surfaces of each module with complementary mating surfaces of adjacent modules. Coupling modules can include fastening or bonding adjacent modules to each other. The plurality of modules can be manufactured.

The invention can be implemented to realize one or more of the following advantages. Ions in an interior volume of the rod assembly can be shielded from noise, undesired electrical fields or influences using shield elements integrated in the modules. In the interior volume, multipole electric potentials can be shielded from external electric potentials by grounding the shield elements of the module. The shield elements can help to uniformly distribute heat in the rod assembly. The multipole rod assembly can be shielded without the added complexity of extra shield elements. The interior volume can be pressurized or evacuated relative to the outside chamber by using sealed shield elements. A shield element of a module can define apertures for accessing the interior volume. For example, ions, uncharged particles, or photons can be introduced to or extracted from the interior volume through apertures in the shield elements. The multipole rods can be positioned with a high precision. Each module can be machined as a single unit with a high precision. In particular, the multipole rods can be machined after being mounted on the insulating elements in the module. In addition, the multipole rods can be machined concurrently with mating surfaces that are used to couple one module to another. For example, a single high precision grinding wheel can be used for machining both the multipole rods and the mating surfaces. The multipole rods can be easily segmented.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
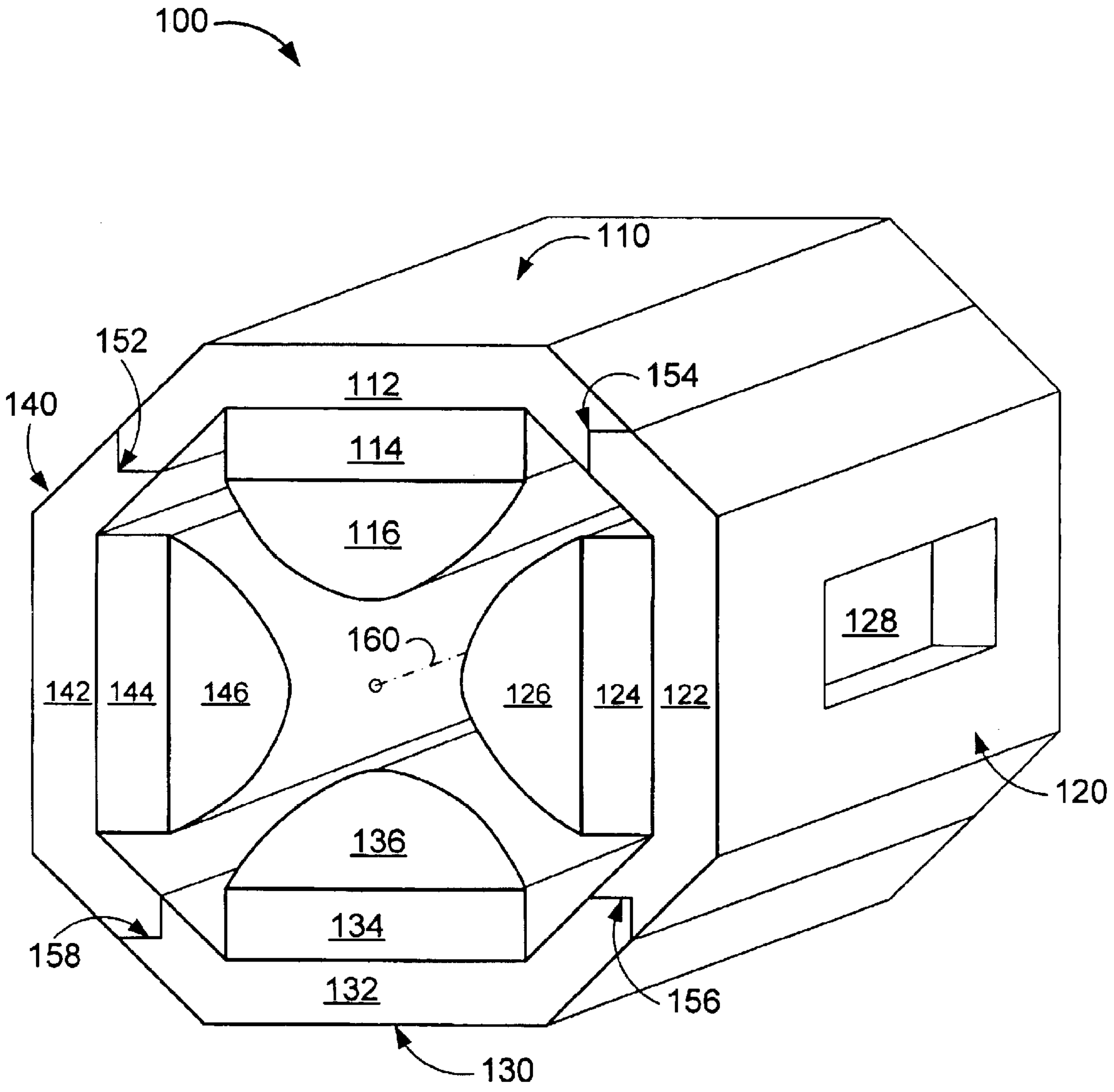
FIGS. 1 and 3 are schematic diagrams illustrating multipole rod assemblies.

FIG. 1 illustrates a multipole rod assembly 100 according to one aspect of the invention. The multipole rod assembly 100 can be used in a mass spectrometer to guide and/or trap ions, for example, as a quadrupole ion guide or a linear quadrupole ion trap. The multipole rod assembly 100 includes modules 110, 120, 130, and 140. Each module includes a shield element (112, 122, 132, and 142, respectively), at least one insulating element (114, 124, 134, and 144, respectively), and at least one multipole rod (116, 126, 136, and 146, respectively).

In each module, the shield element (112, 122, 132, or 142) includes an electrically conductive material, e.g., metal, that can be connected to a source of constant voltage, such as ground, to shield electric fields. The shield may have some voltage oscillations due to capacitive coupling or current leakage between the multipole rods and the shield. These oscillations in the shield can depend on the amplitude and frequency of the voltage applied to the multipole rods. However, such oscillations are typically substantially smaller than the voltage applied to the multipole rods.

In one implementation, the shield element is made of a metal that has a small thermal expansion coefficient so that temperature changes cause small volume changes in the shield element. In a particular embodiment, the shield element is made of invar, a 36% nickel-iron alloy that has a very low coefficient of thermal expansion (at room temperature, approximately about one tenth that of carbon steel). By minimizing volume changes due to heat in the shield element, the modules can avoid mechanical stress that may cause cracking, e.g., during manufacturing, and the multipole rod assembly can maintain high precision during operation. Alternatively, the shield element can be made of steel or any other conductive material.

The shield element can be configured to provide structural integrity to the module and couple to other modules, as shown in FIG. 1 and further discussed with reference to FIG. 2A. Alternatively, the shield element can be implemented as a metal film on a non-conductive outer surface of the module, as discussed with reference to FIG. 2B. Optionally, a shield element can define apertures, such as an aperture 128 defined by the shield element 122. The aperture 128 can be used to introduce or extract particles, e.g., ions, in the multipole rod assembly. (In such implementations, the insulating element and the multipole rod of the module also include apertures to introduce or extract the particles. See, e.g., slot 235 in FIG. 2A.) For example, for an assembly 100 configured as a linear ion trap, opposing modules 120 and 140 can incorporate shield elements 122, 142 that include apertures 128 through which ions can be ejected using techniques such as resonance ejection. For ease of manufacturing, each shield element 112, 122, 132, 142 can be configured with an aperture 128, to minimize the number of parts required to construct the assembly.

In each module, an insulating element (114, 124, 134, or 144) is securely coupled to the corresponding shield element (112, 122, 132, or 142, respectively). Alternatively, more than one insulating element can be coupled to the shield element. The insulating element is configured to electrically insulate the shield element from one or more multipole rods of the module. Optionally, the insulating element can have a low coefficient of thermal expansion to minimize mechanical distortions caused by heating the module. Alternatively or in addition, the coefficient of thermal expansion of the insulating element can match that of the shield element to avoid mechanical stress, e.g., during manufacturing. In one implementation, the insulating element is made of quartz. Alternatively, the insulating element can be made of any other insulating material.

The insulating elements can effectively prevent current flows between the shield elements, which are grounded, and the multipole rods, which receive voltage during operation. For example, a thickness of the insulating element can be determined based on a surface resistance of the insulating element. In one implementation, the multiple rods receive at maximum about 5000V (with a frequency that is in the order of a few megahertz), and the insulating elements are made of quartz whose thickness is between about 3 mm and about 5 mm, such as 4 mm or 4.75 mm, between the shield element and a multipole rod: Optionally, the thickness of the quartz can be estimated by accumulating about 1 mm thickness for each 1 KV of operational voltage. By using quartz as the insulating element, the module can have an advantageous thermal stability and power consumption, mainly because quartz has small dielectric loss, i.e., voltage oscillations cause small temperature increases in the quartz. In addition, quartz has small thermal expansion coefficient, similar to that of invar.

In each module, a multipole rod (116, 126, 136, or 146) is mounted on the insulating element (114, 124, 134, or 144, respectively). In alternative implementations, more than one multipole rod can be mounted on one or more insulating elements in one or more of the modules that form the assembly. The multipole rod is used to generate multipole electric potentials for guiding or trapping ions. In one implementation, the multipole rod is made of a metal, e.g., invar. Invar, or other metals with low thermal expansion coefficients, can minimize distortions of the multipole rod when temperature in the module changes. For example, changes in size and/or position that result from such temperature changes may cause distortions in the multipole electric potential and decrease precision of the multipole assembly. Changes in size ultimately change a relationship between the effective range of mass-to-charge ratios and the applied voltage for the assembly. The changed relationship causes errors in the attained mass spectrum. In addition, multipole rods with low thermal expansion coefficients can decrease mechanical stress in the assembly, e.g., during manufacturing.

Each of the multipole rods 116, 126, 136, and 146 has a hyperbolically shaped multipole surface to generate the multipole electric potentials. In alternative implementations, multipole rods can have other curved multipole surfaces, e.g., that of a cylindrical rod, or even flat surfaces, e.g., that of a rectangular rod, depending on the requirements of the particular application. Precision of the multipole surfaces and their relative positions determines precision of the generated multipole electric potentials. Manufacturing and positioning multipole surfaces with high precision are discussed with reference to FIGS. 4–6B.

The modules 110, 120, 130, and 140 are coupled together to form the multipole rod assembly 100. The assembly 100 shown in FIG. 1 is a quadrupole rod assembly that is formed from four modules where each module includes a single multipole rod. In alternative implementations, the assembly can be formed from, e.g., two or three modules and each module can include more than one multipole rod (see, e.g., FIG. 3). Other multipole rod assemblies, e.g., hexapole or octapole rod assemblies, can also be formed from modules. For example, an octapole rod assembly can be formed from four modules, each having two multipole rods.

In the assembly 100, the multipole rods are essentially parallel with each other and define an interior volume along an axis 160. Ions can be guided or trapped in or along the interior volume by the multipole electric potentials generated by the multipole rods. Positions of the multipole rods relative to each other can be critical to the precision of the multipole electric potential and, eventually, the ion guiding or trapping functionality of the assembly. In the assembly 100, the relative positions have two components: position of the multipole rod in the module and positions of the modules relative to each other.

To position the modules relative to each other with high precision, the modules can have matching mating surfaces 152–158. That is, each module has a mating surface that matches a complementary mating surface of another module when the two modules are properly coupled. In one implementation, mating surfaces can include one or more indentations to ensure high precision positioning of the modules. For example, the mating surface can have a 'V' shape with an angle (e.g., about 90 or about 135 degrees) that allows convenient manufacturing. Alternatively or in addition, the modules can have marks indicating proper alignment of the modules. Manufacturing modules with high precision is further discussed with reference to FIGS. 4–6B.

Figure 2A:
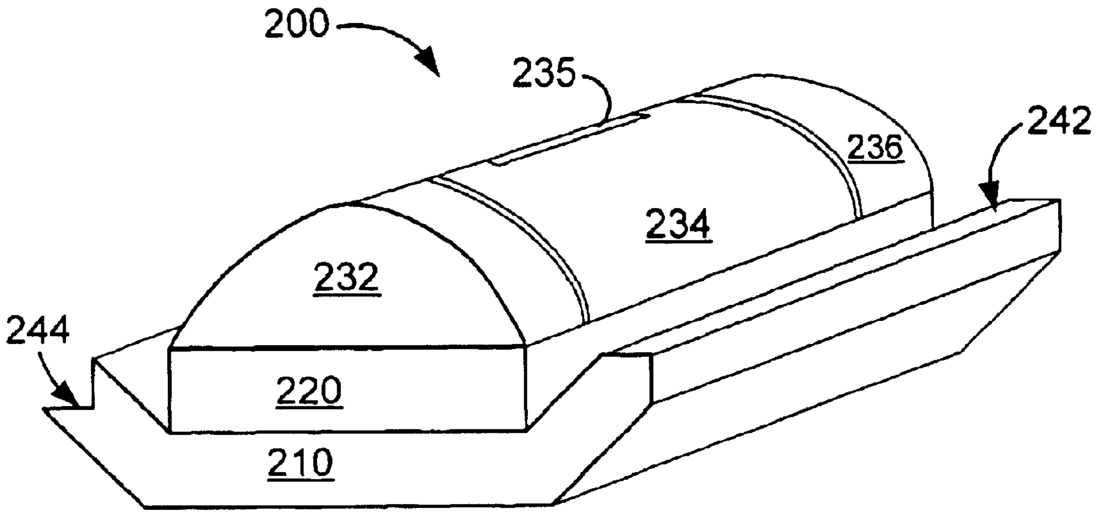
FIGS. 2A and 2B are schematic diagrams illustrating modules for multipole rod assemblies.

FIG. 2A illustrates a module 200 for a quadrupole rod assembly that is formed from four modules, e.g., as shown in FIG. 1. The module 200 includes a shield element 210, an insulating element 220, and multipole rod segments 232, 234, and 236. The shield element 210 is made of metal, and provides structural integrity for the module 200 and electric shielding for the quadrupole assembly. The shield element 210 has a first 242 and a second 244 'V' shaped mating surface to couple the module 200 to other modules in the quadrupole assembly.

The insulating element 220 is coupled to the shield element 210, and the multipole rod segments 232, 234, and 236 are mounted and aligned on the insulating element 220. Each multipole rod segment is a specially shaped metal structure that has a hyperbolic multipole surface to generate quadrupole electric potentials. The multipole rod segments 232, 234, and 236 are mounted on the insulating element 220 that insulates the segments from the shield element 210. In alternative implementations, separate multipole rod segments can be mounted on separate insulating elements, or a single multipole rod segment can be mounted on more than one insulating elements. In addition, neighboring multipole rod segments are insulated from each other by gaps. For example, the gap between two neighboring multipole rod segments can be about 0.5 mm or more. The multipole rod segments 232, 234, and 236 can be operated as a single multipole rod, e.g., by applying the same voltage on each segment. Alternatively, different multipole rod segments can be operated as independent multipole rods, e.g., by applying different voltage on the different segments.

In one implementation, a quadrupole ion trap can be formed using four modules similar to the module 200. The ions can be trapped in an interior volume facing the multipole rod segment 234, which is positioned between the multipole rod segments 232 and 236, e.g., by applying different voltage to the multipole rod segment 234 and the multipole rod segments 232 and 236. In two opposing modules of the ion trap, the multipole rod segment 234 can define a slot 235 through which ions or other particles (including photons) can be introduced to or extracted from the interior volume. In one implementation, the multipole rod segment 234 has a concave back surface to facilitate manufacturing the slot 235. The slot 235 may cause distortions in quadrupole electric potentials, which can be compensated, e.g., by "stretching," i.e., increasing distance between the two modules with slot. In alternative implementations, ions and particles can be introduced or extracted without a slot in a multipole rod or a multipole rod segment, e.g., through gaps between multipole rods, or along an axis of the interior volume.

Figure 2B:
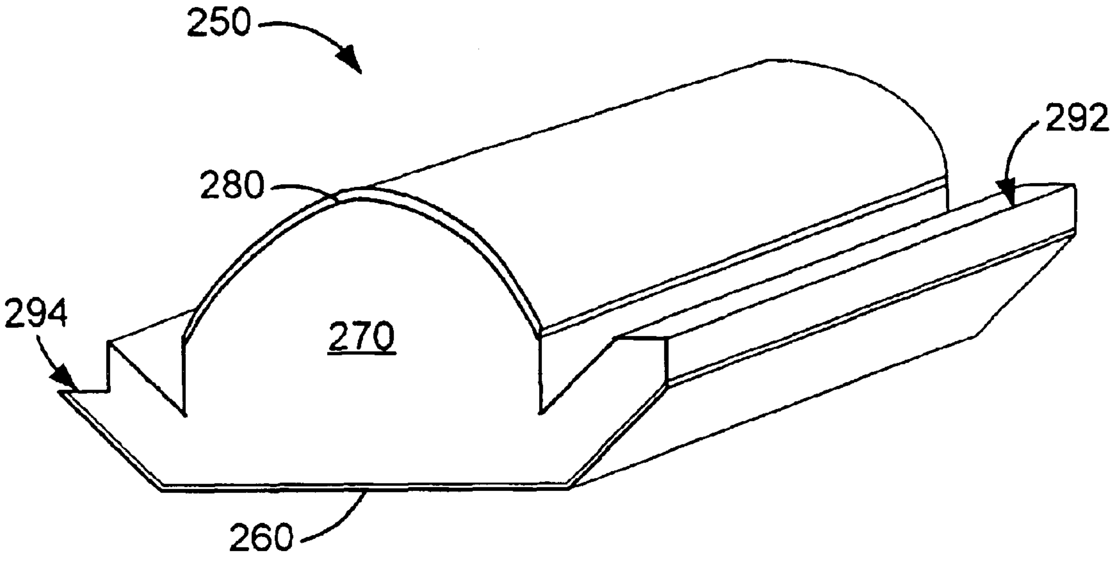

FIG. 2B illustrates a module 250 for a quadrupole rod assembly that is formed from four modules (e.g., as shown in FIG. 1). For example, a quadrupole ion guide can be formed using four modules similar to module 250. The module 250 includes a shield element 260, an insulating element 270, and a multipole rod 280. The insulating element 270 provides structural integrity to the module, and the shield element 260 and the multipole rod 280 are implemented as metal layers on the insulating elements. For example, the metal layers can be vapor deposited on the insulating element 270. In alternative implementations, only one of the shield element and the multipole rod can be implemented as a metal layer. Optionally, the insulating element 270 and/or the metal layers can be made of materials that have low and/or matching coefficient of thermal expansion to increase thermal stability of the assembly.

Figure 3:
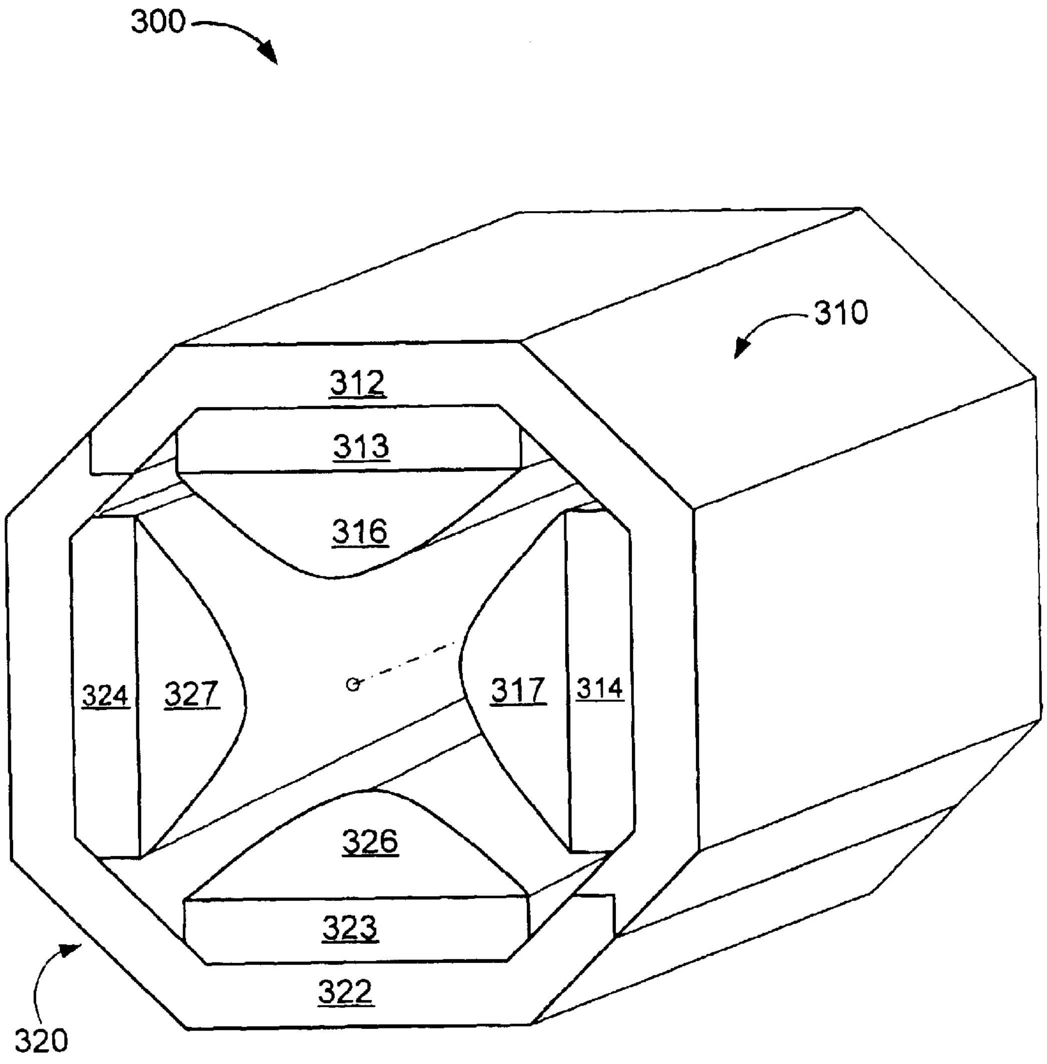

FIG. 3 illustrates a quadrupole rod assembly 300 that is formed from two modules, modules 310 and 320. Each of the modules 310 and 320 includes a shielding element (312 and 322, respectively), two insulating elements (313–314 and 323–324, respectively), and two parallel multipole rods (316–317 and 326–327, respectively). The quadrupole rod assembly 300 can include the same features and perform the same functions as the quadrupole rod assembly 100 discussed above with reference to FIG. 1.

Figure 4:
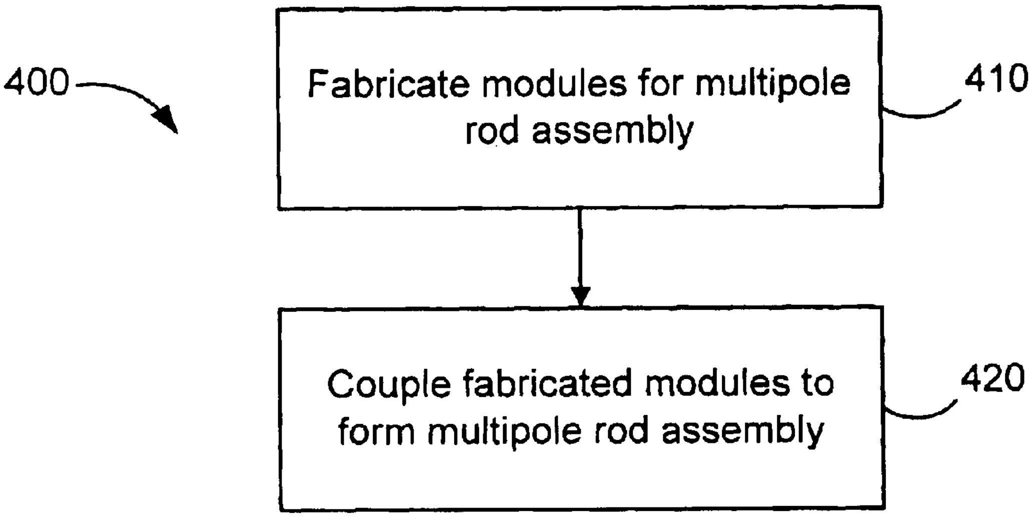
FIGS. 4 and 5 are schematic flow diagrams showing methods for manufacturing multipole assemblies.

FIG. 4 shows a method 400 for manufacturing multipole rod assemblies, such as multipole rod assemblies discussed above with reference to FIGS. 1–3. Modules for a multipole rod assembly are manufactured (step 410), for example, using a method discussed below with reference to FIG. 5.

The manufactured modules are coupled to each other to form the multipole rod assembly (step 420). The modules can be fastened together, e.g., using screws or any other fastener, or bonded together, e.g., using adhesives or welding, or coupled together with other joining techniques. Alternatively, the modules can be coupled without fastening or bonding, e.g., held together by external apparatus. Optionally, each module can include two or more mating surfaces, and complementary mating surfaces of adjacent modules can be matched to couple the modules forming the assembly.

Figure 5:
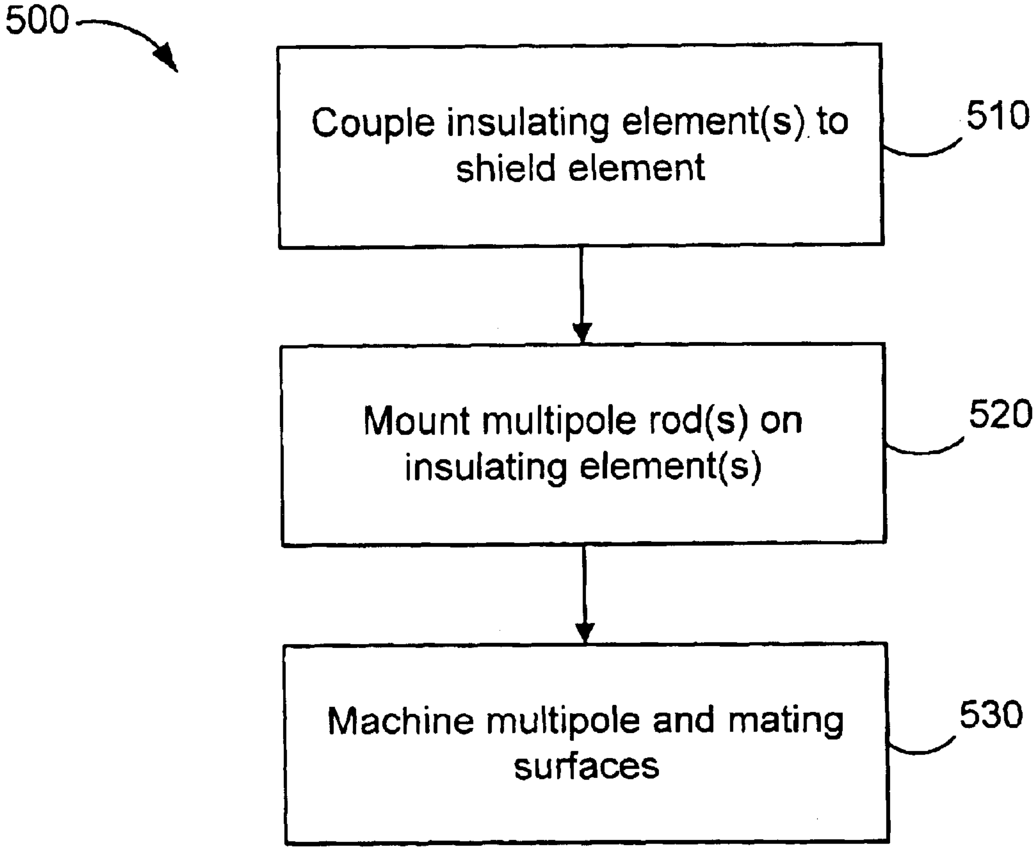

FIG. 5 shows a method 500 for manufacturing a module for a multipole rod assembly. For example, the method 500 can be used to manufacture the modules discussed above with reference to FIGS. 1–3.

One or more insulating elements are coupled to a shield element (step 510). In one implementation, the shield element is a metal structure configured to provide structural integrity to the module, and the insulating element is bonded to the shield element, e.g., using epoxy technology. Alternatively, the insulating element can be fastened to the shield element, e.g., with ceramic screws. In an alternative implementation, an insulating element is configured to provide structural integrity to the module and the shield element is deposited on the insulating element as a metal layer.

One or more multipole rods are mounted on the insulating elements (step 520). In one implementation, one or more multipole rods are metal structures that are bonded to the insulating elements, e.g., with epoxy. Alternatively, the multipole rods can be fastened to the insulating elements, e.g., with ceramic screws. In an alternative implementation, one or more multipole rods are implemented as metal layers deposited on the insulating element.

Optionally, one or more multipole rods can have rod segments arranged along an axis. For example, the rod segments can be mounted on the insulating element separately. Alternatively, a single multipole rod can be mounted on the insulating element, and the rod segments can be formed, e.g., cut, from the mounted single multipole rod.

When the multipole rod or rods have been mounted, one or more surfaces of the module are machined to form one or more multipole surfaces on the multipole rod(s) and one or more mating surfaces (step 530). Multipole surfaces are used to generate multipole electric potentials for guiding and trapping ions. Mating surfaces are used for coupling the module to other modules. In one implementation, the multipole and mating surfaces are formed concurrently, e.g., ground or polished with a single machining tool, such as a grinding wheel with a special profile, as discussed below with reference to FIGS. 6A and 6B. Using a single machining tool can provide a high precision in forming and positioning the multipole surfaces relative to the module and, through the mating surfaces, to other modules as well.

The mating surfaces can be machined on the element that provides structural integrity of the module. For example, if the shielding element provides structural integrity, mating surfaces can be machined on the shielding element; if the shielding element is only a metal layer and structural integrity is provided by one or more insulating elements, mating surfaces can be machined on the insulating elements.

Figure 6A:
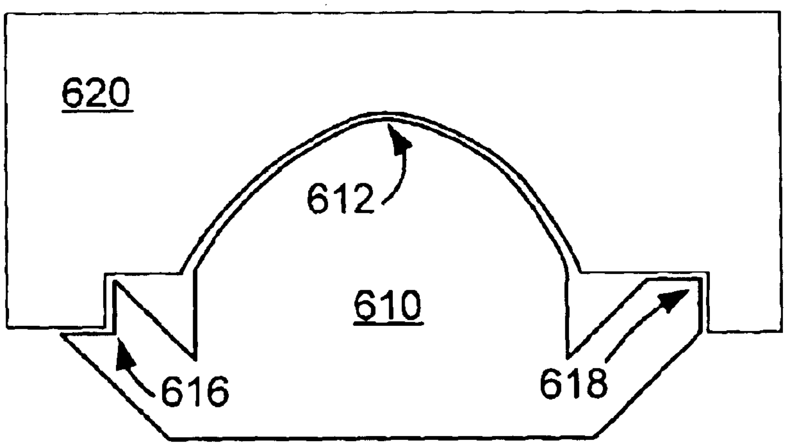
FIGS. 6A and 6B are schematic diagrams illustrating modules for multipole rod assemblies and corresponding machining tools for manufacturing the modules.
Figure 6B:
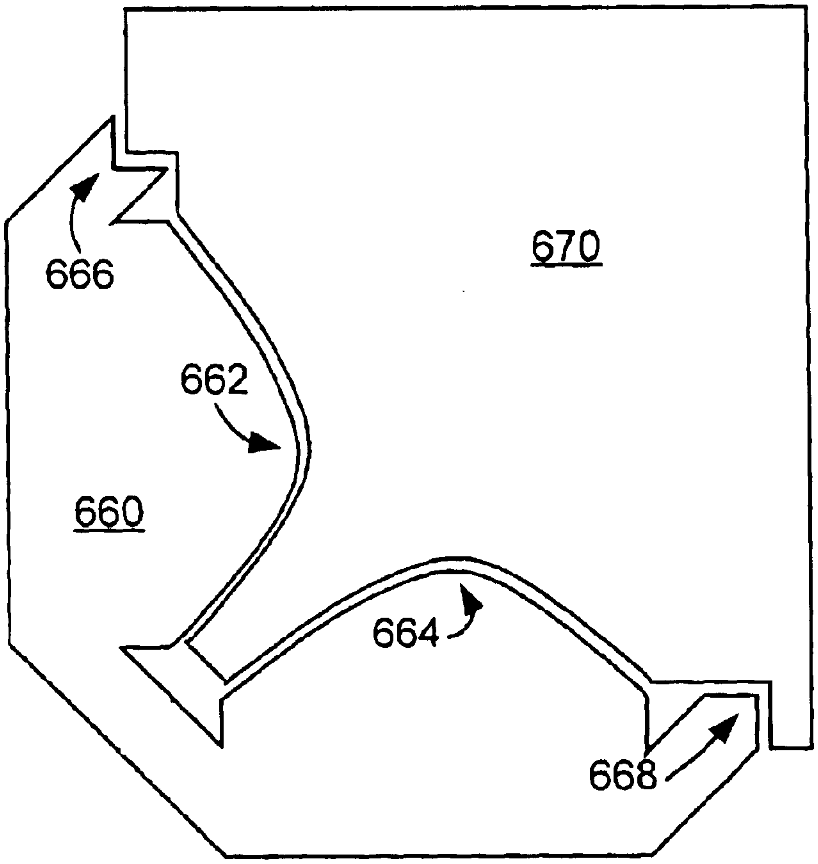

FIGS. 6A and 6B illustrates machining modules for multipole assemblies with machining tools, e.g., grinding wheels. FIG. 6A shows the outline of a module 610 (without the detailed structure of the module) and a machining tool 620 in a cross section. The module 610 has a multipole surface 612 and mating surfaces 616 and 618, and can be similar to modules 200 or 250 (FIGS. 2A and 2B). For example, the multipole surface 612 can be defined by any of the multipole rod 280 and multipole rod segments 232, 234 and 236, and the mating surfaces 616 and 618 can be defined by the metal shield element 210 or the insulating element 270.

The machining tool 620 is configured to machine the module 610, and has a profile that matches the multipole surface 612 and the mating surfaces 616 and 618 of the module. The profile of the machining tool 620 allows concurrent and high precision machining of the multipole 612 and mating surfaces 616 and 618. For example, the mating surfaces 616 and 618 can have a high precision position relative to the multipole surface 612.

FIG. 6B shows the outline of a module 660 (without the detailed structure of the module) and a machining tool 670 in a cross section. The module 660 includes multipole surfaces 662 and 664 and mating surfaces 666 and 668, and can be similar to the modules 310 and 320 used in the quadrupole rod assembly 300 (FIG. 3). For example, the multipole surfaces 662 and 664 can be defined by the multipole rods 316 and 317, and the mating surfaces 666 and 668 can be defined by the metal shield element 312. Alternatively, the module 660 can be an insulating element on which shield and multipole rod elements can be deposited as metal layers (either before or after machining).

The machining tool 670 is configured to machine the module 660, and has a profile that matches the multipole surfaces 662 and 664 and mating surfaces 666 and 668. The profile of the machining tool 670 allows concurrent and high precision machining of the multipole 662 and 664 and mating surfaces 666 and 668. For example, machining with a single profile can position the multipole surfaces 662 and 664 with high precision relative to each other, and also to the mating surfaces 666 and 668.

The invention has been described in terms of particular embodiments. Other embodiments are within the scope of the following claims. For example, the steps of the invention can be performed in a different order and still achieve desirable results.

What is claimed is:

1. A multipole rod assembly for guiding or trapping ions in a mass spectrometer, the assembly comprising:

a plurality of modules, each module including a shield element, one or more insulating elements coupled to the shield element, and one or more multipole rods mounted on the insulating elements, wherein the plurality of modules are coupled together to form the multipole rod assembly such that the multipole rods of the modules define an interior volume for guiding or trapping ions.

2. The assembly of claim 1, further comprising:

two or more mating surfaces in each module, and wherein the plurality of modules are coupled by matching mating surfaces of each module with complementary mating surfaces of adjacent modules in the multipole rod assembly.

3. The assembly of claim 2, wherein:

in each module in the plurality, the shield element is a metal structure including the two or more mating surfaces.

4. The assembly of claim 2, wherein:

in each module in the plurality, the shield element is a metal layer on one or more insulating elements of the module, and the two or more mating surfaces are formed in one or more insulating elements of the module.

5. The assembly of claim 1, wherein:

each multipole rod in the assembly defines a hyperbolic surface configured to generate multipole electric potentials in the interior volume.

6. The assembly of claim 1, wherein:

the assembly includes four multipole rods configured to generate a quadrupole electric potential in the interior volume.

7. The assembly of claim 6, wherein:

each of the four multipole rods configured to generate a quadrupole electric potential is mounted on a different module.

8. The assembly of claim 1, wherein:

the assembly includes eight multipole rods configured to generate an octapole electric potential in the interior volume.

9. The assembly of claim 1, wherein:

each module includes two or more multipole rod segments arranged along a single axis.

10. A module for forming a multipole rod assembly for guiding or trapping ions in a mass spectrometer, the multipole rod assembly being formed from two or more modules, the module comprising:

a shield element, one or more insulating elements coupled to the shield element, and one or more multipole rods mounted on the insulating elements.

11. The module of claim 10, further comprising:

two or more mating surfaces, each mating surface being configured to couple to a complementary mating surface of another module in the multipole rod assembly.

12. The module of claim 11, wherein:

the shield element is a metal structure including the two or more mating surfaces.

13. The module of claim 11, wherein:

the shield element is a metal layer on one or more insulating elements of the module, and the two or more mating surfaces are formed in one or more insulating elements of the module.

14. The module of claim 10, wherein:

each multipole rod defines a hyperbolic surface configured to generate multipole electric potentials in an interior volume of the multipole rod assembly.

15. The module of claim 10, wherein:

the module includes two or more multipole rod segments arranged along a single axis.

16. A method for manufacturing a module for a multipole rod assembly for guiding or trapping ions in a mass spectrometer, the method comprising:

coupling one or more insulating elements to a shield element;

mounting one or more multipole rods on the one or more insulating elements to form the module; and machining the mounted multipole rods to form multipole surfaces;

wherein the multipole rod assembly is formed by coupling together a plurality of modules manufactured separately.

17. The method of claim 16, further comprising:

machining the module to form two -or more mating surfaces to couple the module with another module.

18. The method of claim 17, wherein:

machining the mounted multipole rods and machining the module to form mating surfaces include using a machining tool having a single profile for machining the mounted multipole rods and the module to form mating surfaces.

19. The method of claim 17, wherein:

machining the module to form mating surfaces includes machining the shield element.

20. The method of claim 17, wherein:

machining the module to form mating surfaces includes machining one or more of the insulating elements.

21. The method of claim 16, wherein:

coupling one or more insulating elements to a shield element includes bonding one or more insulating elements to a metal structure of the shield element.

22. The method of claim 16, wherein:

coupling one or more insulating elements to a shield element includes depositing a metal layer on one or more insulating elements.

23. The method of claim 16, wherein:

mounting one or more multipole rods on the one or more insulating elements includes bonding one or more multipole rods on the one or more insulating elements.

24. The method of claim 16, wherein:

mounting one or more multipole rods on the one or more insulating elements includes depositing a metal layer on one or more insulating elements.

25. The method of claim 16, further comprising:

segmenting one or more multipole rods.

26. A method of manufacturing a multipole rod assembly for use in a mass spectrometer, the method comprising:

coupling a plurality of modules, each module including a shield element, one or more insulating elements coupled to the shield element, and one or more multipole rods mounted on the insulating elements.

27. The method of claim 26, wherein each module includes two or more mating surfaces, and wherein:

coupling a plurality of modules includes matching mating surfaces of each module with complementary mating surfaces of adjacent modules.

28. The method of claim 26, wherein:

coupling a plurality of modules includes fastening adjacent modules to each other.

29. The method of claim 26, wherein:

coupling a plurality of modules includes bonding adjacent modules to each other.

30. The method of claim 26, further comprising:

manufacturing the plurality of modules.

* * * * *

UNITED STATES PATENT AND TRADEMARK OFFICE

CERTIFICATE OF CORRECTION

PATENT NO. : 6,936,815 B2

DATED : August 30, 2005

INVENTOR(S) : Berg A. Tehlirian, Michael W. Senko and Nigel P. Gore

It is certified that error appears in the above-identified patent and that said Letters Patent is hereby corrected as shown below:

Column 10,

Line 18, replace "two -or more" with -- two or more --.

Signed and Sealed this

Twenty-fifth Day of April, 2006

JON W. DUDAS

*Director of the United States Patent and Trademark Office*